United States Patent [19]

Yoshida et al.

[11] Patent Number: 4,712,377
[45] Date of Patent: Dec. 15, 1987

[54] CONTROL APPARATUS FOR HYDRAULIC MOTOR

[75] Inventors: Toshiyuki Yoshida, Kawasaki; Mitsuru Arai, Kamakura, both of Japan

[73] Assignee: Kabushiki Kaisha Komatsu Seisakusho, Tokyo, Japan

[21] Appl. No.: 776,016

[22] Filed: Sep. 13, 1985

[30] Foreign Application Priority Data

Sep. 17, 1984 [JP] Japan ............................ 59-139397[U]

[51] Int. Cl.$^4$ .............................................. F16D 31/02
[52] U.S. Cl. ........................................ 60/444; 60/445; 60/465; 60/488; 60/489; 60/493
[58] Field of Search ................ 60/447, 465, 466, 468, 60/443–445, 487–492, 460, 494

[56] References Cited

U.S. PATENT DOCUMENTS

| | | | |
|---|---|---|---|
| 3,601,235 | 8/1971 | Huf | 60/460 X |
| 3,625,637 | 12/1971 | Kiwalle et al. | 60/448 |
| 3,734,225 | 5/1973 | Kobald et al. | 60/488 X |
| 3,736,753 | 6/1973 | Roth | 60/489 |
| 3,788,075 | 1/1974 | Holdeman et al. | 60/489 X |
| 4,364,230 | 12/1982 | Holmes | 60/444 |
| 4,481,770 | 11/1984 | Lohbauer et al. | 60/468 |
| 4,520,626 | 6/1985 | Nakajima et al. | 60/468 |
| 4,530,416 | 7/1985 | Kassai | 60/490 X |

FOREIGN PATENT DOCUMENTS 0043002 3/1982 Japan ............................ 60/445

Primary Examiner—Edward K. Look
Attorney, Agent, or Firm—Frost & Jacobs

[57] ABSTRACT

A control apparatus for a hydraulic motor for use in a construction vehicle driven by hydraulic power has a hydraulic motor, a hydraulic pump serving as a pressurized fluid supply source, a manually operable directional control valve connected across supply and discharge conduits for the hydraulic motor, a brake valve section including a counterbalancing valve and a pair of relief valves all of which are connected across the conduits extending between the directional control valve and the hydraulic motor, and a selector valve for controlling the supply of control pressurized fluid introduced through a shuttle valve connected across the conduits into a displacement control cylinder contained in the hydraulic motor. The selector valve is of a pilot operated type remotely controlled by pilot pressurized fluid supplied from an external pressurized fluid supply source.

3 Claims, 3 Drawing Figures

CONTROL APPARATUS FOR HYDRAULIC MOTOR

BACKGROUND OF THE INVENTION

1. Field of the Invention:

This invention relates to improvements in a control apparatus for a hydraulic motor mainly used as a drive motor for running of a construction vehicle driven by hydraulic power.

2. Description of the Prior Art:

As for drive motors for running of hydraulically driven type construction vehicles such as gyratory excavators, hydraulic motors of variable displacement type have so far been used to enable the vehicle speed to be changed readily. The hydraulic motors of the kind specified have been arranged so that the rotational speed thereof may be controlled by changing the inclination of the inclined shaft or swash plate thereof.

To change the inclination angle of the swash plate, a displacement control cylinder contained in the hydraulic motor is actuated. To achieve this purpose, there have been employed two systems, one of which is of a self-pressure controlled system as described in the Japanese Utility Model Publication No. 59-7647 wherein the pressure to drive the hydraulic motor is supplied directly in the displacement control cylinder, and the other of which is of a pilot pressure controlled system wherein the pressurized fluid from an external pressurized fluid supply source is supplied into the displacement control cylinder.

The control apparatus of the self-pressure controlled system is advantageous in that the number of external conduits attached thereto and the configurational dimension thereof can be reduced, but is disadvantageous in that the fluid pressure for driving the hydraulic motor is required to be kept comparatively high. For example, when a vehicle equipped with a self-pressure controlled type control apparatus for hydraulic motor is running down a slope, the number of revolutions of the engine is reduced and the amount of pressurized fluid supplied from a pressurized fluid supply source into the hydraulic motor is comparatively small. Consequently, the hydraulic motor is driven reversely by the dead load of the vehicle thus causing a pumping effect. As a result, the fluid pressure in the circuit connected between the pressurized fluid supply source and the hydraulic motor is reduced. Whilst, the fluid pressure in the circuit between the delivery side of the hydraulic motor and the counterbalancing valve which is installed in the hydraulic brake valve section is maintained comparatively higher than that in the supply side, because of a restriction in the amount of fluid discharged from the hydraulic motor by the action of the counterbalancing valve itself. If, under such condition, the fluid under pressure supplied into the displacement control cylinder for the hydraulic motor is taken out from the circuit between the pressurized fluid supply source and the hydraulic motor, the pressure in this circuit is so low that it becomes impossible to make controls by the displacement control cylinder by operating the selector valve when the vehicle is running down a slope, thus causing failure in control of the displacement of the hydraulic motor.

Whilst, the pilot pressure controlled type control apparatus for hydraulic motor in which the pressurized fluid from an external pressurized fluid supply source is utilized has no such disadvantage as mentioned above, but is disadvantageous in that it is required to increase the number of external conduits attached thereto, and also increase in the configurational dimension thereof is unavoidable.

The conventional control apparatuses for hydraulic motors are further disadvantageous in that, since a manually operable selector valve is employed to control the displacement control cylinder contained in the hydraulic motor, troublesome operation is required for the operator, and the operating performance thereof becomes low.

SUMMARY OF THE INVENTION

The present invention has been made with a view to eliminating the above-mentioned disadvantages in the prior art hydraulic motor control apparatuses, and has for its object to provide a control apparatus for hydraulic motor wherein a selector valve is provided to control the supply of the pressurized control fluid, which is introduced through a shuttle valve from a conduit connected between the pressurized fluid supply source and the hydraulic motor, into a displacement control cylinder contained in the hydraulic motor, and the selector valve can be remotely controlled by a pilot fluid pressure supplied by an external pressurized fluid supply source, without the need for manual operation by the operator. The control apparatus for hydraulic motor according to the present invention enables the operating performance thereof to be improved considerably and the number of external conduits attached thereto to be reduced as compared with that of the conventional pilot pressure controlled type control apparatus, and also the size of the control apparatus per se to be reduced considerably.

To achieve the above-mentioned objects, according to the present invention, there is provided a control apparatus for a hydraulic motor for use in a construction vehicle driven by hydraulic power comprising a hydraulic motor connected to the running gear of the vehicle, a hydraulic pump serving as a pressurized fluid supply source to supply hydraulic fluid into said hydraulic motor, a manually operable directional control valve connected across supply and discharge conduits extending between the hydraulic motor and the pressurized fluid supply source, a brake valve means connected across said conduits which extend between the directional control valve and the hydraulic motor, said brake valve means including a counterbalancing valve and two relief valves, and a selector valve adapted to control the supply of the control pressurized fluid, which is introduced through a shuttle valve connected across said conduits, into a displacement control cylinder contained in said hydraulic motor, characterized in that said selector valve is a pilot pressure operated valve which can be remotely controlled by pilot pressurized fluid supplied from an external pressurized fluid supply source through a pilot fluid conduit.

Further, in the above-mentioned control apparatus for hydraulic motor according to the invention, the shuttle valve may be provided in the conduits between the directional control valve and the counterbalancing valve, or alternatively in the conduits between the brake valve means and the hydraulic motor. In the latter case, even if the fluid pressure to drive the hydraulic motor is low, the pressurized fluid on the discharge side of the hydraulic motor is supplied directly into the displacement control cylinder. Therefore, failure in control of the displacement control cylinder can be eliminated, and the aforementioned disadvantages of the self-pressure controlled type control apparatus for hydraulic motor can also be eliminated.

The above and many other advantages, features and additional objects of the present invention will become apparent to those versed in the art upon making reference to the following description and accompanying drawings in which preferred structural embodiments incorporating the principles of the present invention are shown by way of illustrative example.

DETAILED DESCRIPTION OF THE INVENTION

Figure 1:
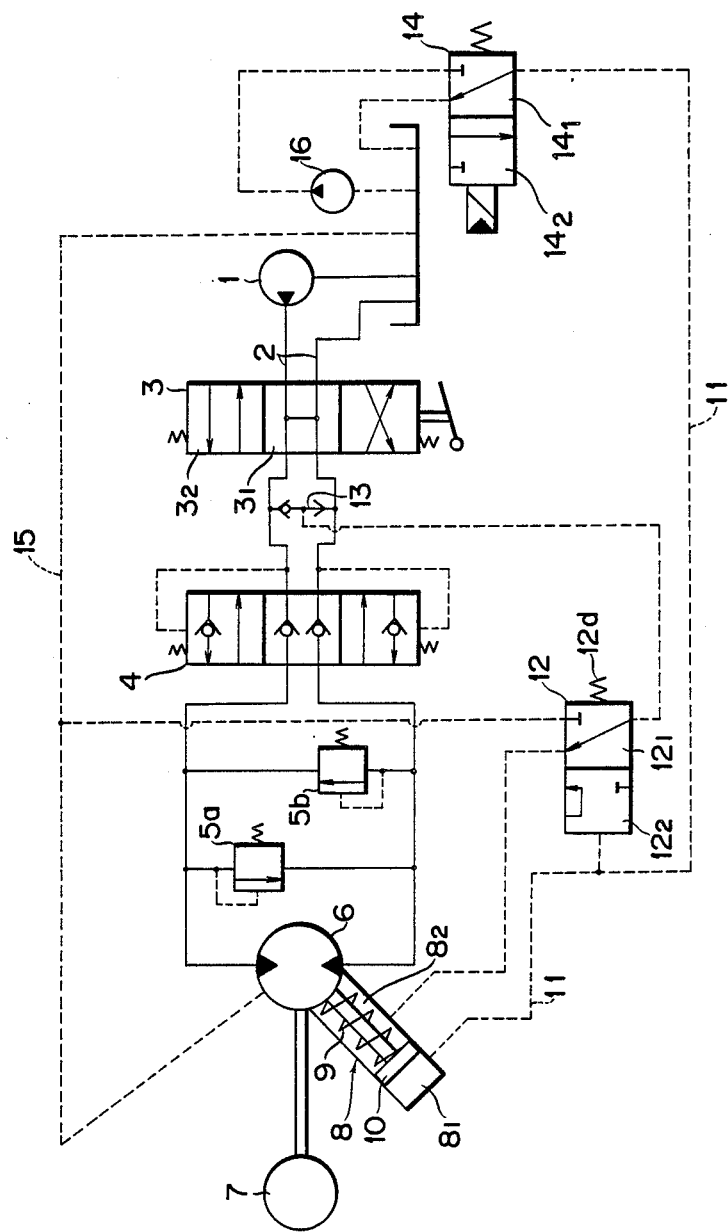
FIG. 1 is a schematic overall circuit diagram showing one embodiment of the control apparatus for hydraulic motor according to the present invention.

One embodiment of the present invention will now be described in detail with reference to FIGS. 1 and 2. In FIG.1, reference numeral 1 denotes a hydraulic pump which serves as pressurized fluid supply source. The pressurized fluid delivered by the hydraulic pump 1 is supplied through a conduit 2 into a manually operated directional control valve 3 from where the fluid under pressure is supplied through a shuttle valve 13, a counterbalancing valve 4, and relief valves 5a and 5b into a hydraulic motor 6 thereby driving a load 7 such as, for example, work implements connected to the hydraulic motor 6. By the combination of the counterbalancing valve 4 and the relief valves 5a, 5b, a brake valve section is composed. The above-mentioned hydraulic motor 6 is of a variable displacement type having a displacement control cylinder 8 for controlling the inclination angle of the inclined shaft or swash plate thereof. Slidably mounted in the displacement control cylinder 8 is a piston 10 which is biased by a compression spring 9 towards the direction to increase the displacement of the hydrulic motor. Further, the inside of the displacement control cylinder 8 is divided by the piston 10 into pressure chambers $8_1$ and $8_2$. The pressure chamber $8_1$ on the bottom side is able to be supplied with the pilot pressurized fluid which is supplied through a solenoid operated control valve 14 from an external pressurized fluid supply source 16 through a pilot conduit 11. Whilst, the pressure chamber $8_2$ on the opposite side is supplied with the control pressurized fluid which is supplied from a shuttle valve 13 through a communicating position $12_1$ of a pilot operated selector valve 12.

Figure 2:
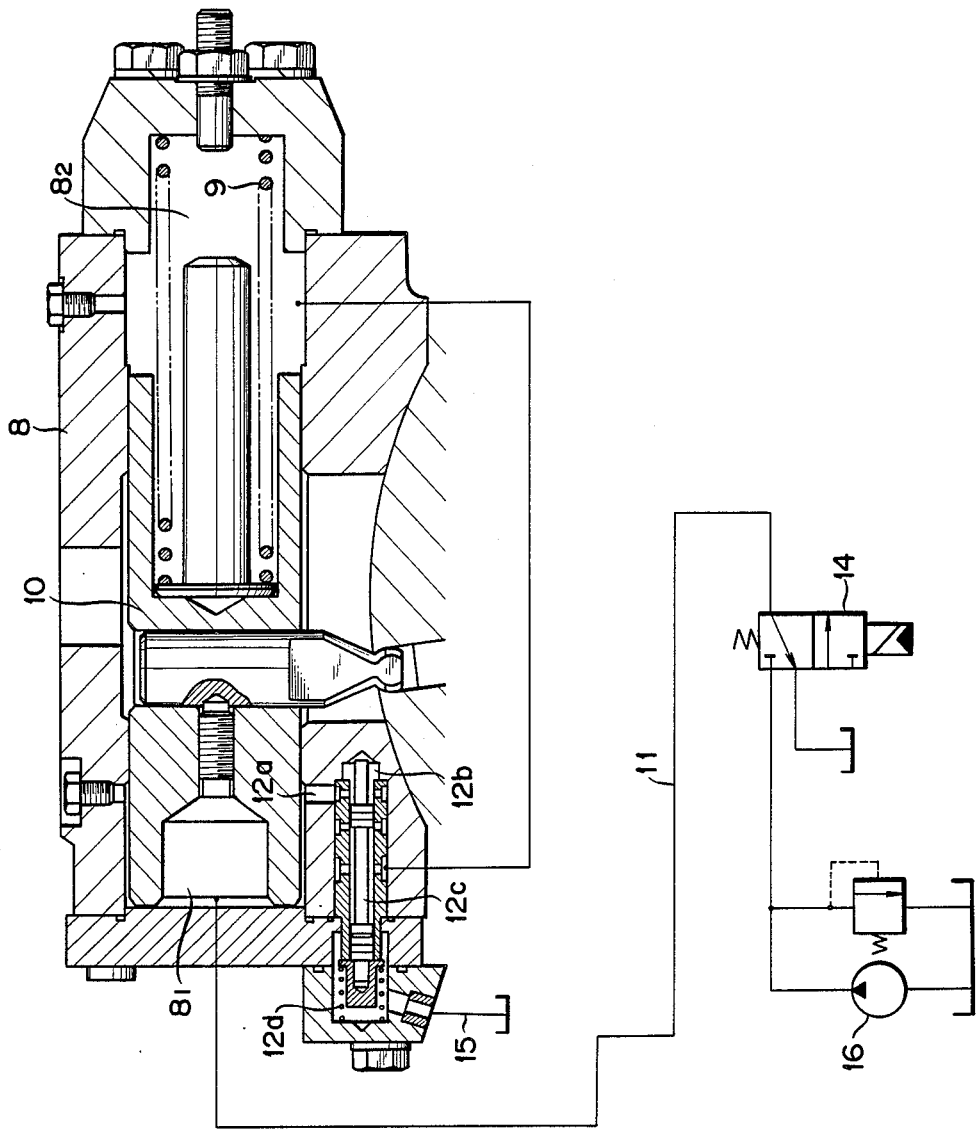
FIG. 2 is a fragmentary, enlarged sectional view showing a displacement control cylinder contained in the hydraulic motor and a selector valve for controlling the displacement control cylinder.

The above-mentioned pilot operated selector valve 12 is contained in the displacement control cylinder 8 as shown in FIG. 2. The arrangment is made such that part of the pilot pressurized fluid, which is supplied through the solenoid operated control valve 14 into the pressure chamber $8_1$, is allowed to flow through a port 12a into a pressure chamber 12b to thereby move a spool 12c to the left against the biasing force of a spring 12d and change the selector valve 12 from its communicating position $12_1$ over to its drain position $12_2$ thus allowing the pressurized fluid in the pressure chamber $8_2$ to be drained into a drain conduit 15.

In the next place, operation of the control apparatus will be described.

When the manually operated direction control valve 3 is changed, for example, from its neutral position $3_1$ to its running position $3_2$ to drive the load 7 connected to the hydraulic motor, the pressurized fluid supplied from the hydraulic pump 1 will flow through the shuttle valve 13 and the counterbalancing valve 4 into the hydraulic motor 6 to thereby rotate the latter and drive the load 7. At the same time, part of the pressurized fluid supplied from the hydraulic pump 1 will flow through the shuttle valve 13 and the communicating position $12_1$ of the pilot operated selector valve 12 into the rod side pressure chamber $8_2$ of the displacement control cylinder 8 thereby increasing the displacement of the hydraulic motor 6. When the solenoid control valve 14 is subsequently opened by remote control to allow the pilot pressurized fluid to be supplied into the pilot fluid conduit 11, the pilot fluid is supplied into the pressure chamber $8_1$ of the displacement control cylinder 8. At the same time, the spool 12c of the selector valve 12 is moved to the left to the drain position $12_2$ by the action of the pressurized fluid introduced into the pressure chamber 12b of the pilot operated selector valve 12, thus allowing the pilot pressurized fluid on the side of the pressure chamber $8_2$ to be drained through drain position $12_2$ into the drain conduit 15. As a result, the piston 10 is moved against the biasing force of the compression spring 9 so as to reduce the capacity of the hydraulic motor 6.

Further, in case where the amount of fluid supplied by the hydraulic pump 1 is small as is in the case when the vehicle is running down a slope and the hydraulic motor 6 is driven reversely by the dead load of the vehicle even when, the pilot operated selector valve 12 is in its communicating position $12_1$ and, at that time, the solenoid operated control valve 14 is in position $14_1$ by remote control as shown in FIGS. 1 and 2, the pressurized fluid from the hydraulic pump 1 for driving the hydraulic motor 6 can be supplied through the shuttle valve 13 and the selector valve 12 into the pressure chamber $8_2$ of the displacement control cylinder 8. (At that time, the minimum hydraulic pressure for shifting the counterbalancing valve 4 into its predetermined position is kept on.) By the cooperation of the pressurized fluid supplied into the pressure chamber $8_2$ and the resilient force of the spring 9, therefore, such a disadvantage as the failure in control of the displacement of the hydraulic motor 6 when the vehicle is running down a slope can be eliminated.

On the other hand, when the solenoid operated control valve 14 is shifted in another position $14_2$ by remote control, the pilot fluid from the supply source 16 is supplied into the pressure chamber $8_1$ of the displacement control cylinder 8, the control of the inclination angle of the swash plate of the motor 6 can be smoothly conducted.

Figure 3:
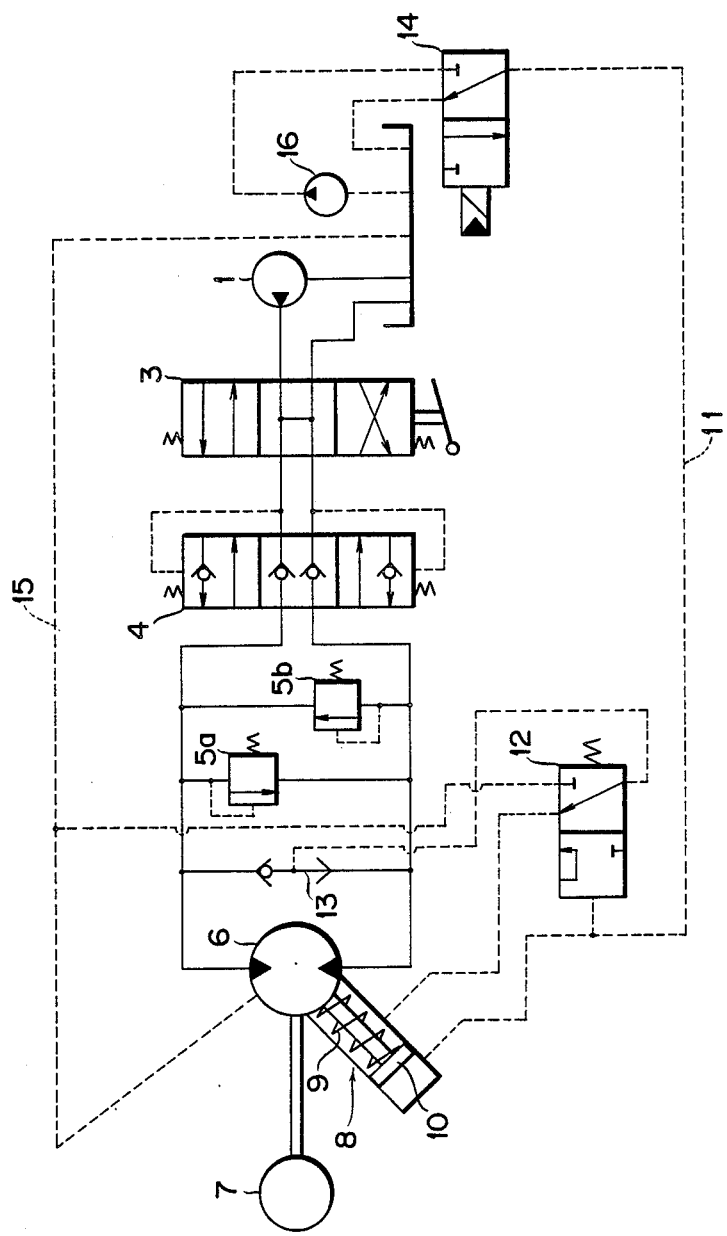
FIG. 3 is a schematic overall circuit diagram showing another embodiment of the control apparatus for hydraulic motor according to the present invention.

In FIG. 3, there is shown another embodiment of the present invention wherein a shuttle valve 13 for supplying control pressurized fluid into a pilot operated selector valve 12 is connected across supply and discharge conduits which extend between a hydraulic motor 6 and relief valves 5a, 5b of a brake valve section.

It is to be understood that the foregoing relates to only preferred embodiments of the invention, and that it is intended to cover all changes and modifications of the example of the invention herein chosen for the purposes of the disclosure, which do not constitute departures from the spirit and scope of the invention.

What is claimed is:

1. A control apparatus for a hydraulic motor for use in a construction vehicle driven by hydraulic power, comprising:
   (a) a hydraulic motor connected to the running gear of the vehicle;
   (b) a hydraulic pump serving as a pressurized fluid supply source to supply hydraulic fluid into said hydraulic motor;
   (c) a manually operable directional control valve connected across supply and discharge conduits which extend between said hydraulic motor and said pressurized fluid supply source;
   (d) a brake valve means connected across said conduits which extend between said directional control valve and said hydraulic motor, said brake valve means including a counterbalancing valve and two relief valves, said counnterbalancing valve and said relief valves all being connected across said supply and discharge conduits which extend between said manually operable directional control valve and said hydraulic motor; and
   (e) a selector valve adapted to control the supply of control pressurized fluid, which is introduced through a shuttle valve connected across said conduits, into a displacement control cylinder contained in said hydraulic motor, said selector valve being a pilot operated type selector valve which can be remotely controlled by pilot pressurized fluid supplied from an external pressurized fluid supply source through a pilot fluid conduit in which a remote controlled solenoid operated control valve is provided for selectively connecting said selector valve and a bottom side pressure chamber of said displacement control cylinder with said external pressurized fluid supply source and with a drain conduit.

2. The control apparatus for hydraulic motor as claimed in claim 1, characterized in that said shuttle valve is connected across said supply and discharge conduits which extend between said directional control valve and said counterbalancing valve.

3. The control apparatus for hydraulic motor as claimed in claim 1, characterized in that said shuttle valve is connected across said supply and discharge conduits which extend between said brake valve means and said hydraulic motor.